May 19, 1970 3,512,555

ACCELERATION RESPONSIVE DEVICES

Filed Oct. 18, 1967 3 Sheets-Sheet 1

INVENTOR.
ASBJORN M. SEVERSON
BY Carl L. Johnson
ATTORNEY

May 19, 1970   A. M. SEVERSON   3,512,555

ACCELERATION RESPONSIVE DEVICES

Filed Oct. 18, 1967   3 Sheets-Sheet 2

INVENTOR.
ASBJORN M. SEVERSON
BY Carl S. Johnson

ATTORNEY

May 19, 1970    A. M. SEVERSON    3,512,555
ACCELERATION RESPONSIVE DEVICES
Filed Oct. 18, 1967    3 Sheets-Sheet 3

INVENTOR.
ASBJORN M. SEVERSON
BY Carl L. Johnson
ATTORNEY

United States Patent Office 3,512,555
Patented May 19, 1970

3,512,555
ACCELERATION RESPONSIVE DEVICES
Asbjorn M. Severson, Minneapolis, Minn., assignor to Honeywell Inc., Minneapolis, Minn., a corporation of Delaware
Filed Oct. 18, 1967, Ser. No. 676,203
Int. Cl. G05d 13/06
U.S. Cl. 137—45          8 Claims

ABSTRACT OF THE DISCLOSURE

Acceleration sensing apparatus including a pivotally mounted Y shaped magnetic mass. A pair of magnets mounted in fixed positions adjacent to two extremities of the mass normally maintain the mass in a set position against one magnet, vibration in excess of a predetermined magnitude being effective to dislodge the mass, in which case it is held in a tripped position against the other magnet. The position of the mass controls a fluidic relay which produces a fluid signal effective, by means of a self reset mechanism, to automatically reset the mass after a predetermined lapse of time.

Background of the invention

This invention relates generally to acceleration responsive devices and, more particularly, to such devices which can provide a fluidic output signal when accelerations such as vibrations exceed a predetermined value.

A need for reliable acceleration sensors that produce fluidic output signals suitable for controlling fluidic amplifiers has developed with the advent of fluidic annunciator systems. Such acceleration sensors are frequently required on apparatus located in remote areas, such as on compressors for large natural gas pipe lines. Because an operator may only periodically check on the sensors they must be highly reliable. The present invention comprises an acceleration sensor that provides a fluidic output signal and offers a high reliability for use in these applications.

Summary of the invention

Briefly, the invention comprises an acceleration sensor having a movable mass magnetically coupled to a housing, so that when accelerations exceed a predetermined value, the magnetic coupling is insufficient to restrain the mass. This allows the mass to pivot on a flexible hinge and trip a fluidic relay which produces a fluidic output signal that controls an external system, and that repositions the mass after the excess accelerations have subsided.

Description of the preferred embodiment

Figure 1:
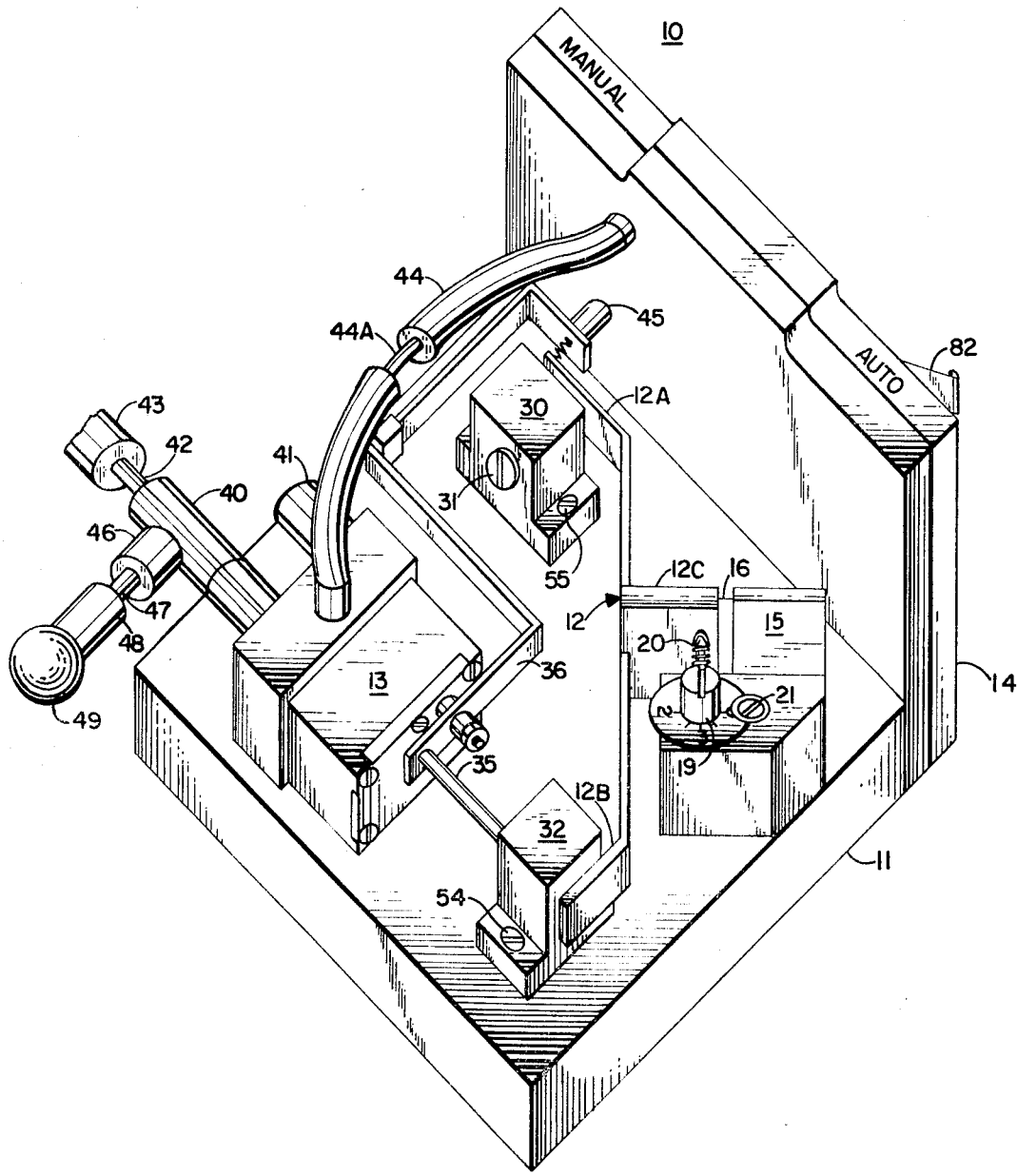
FIG. 1 is a perspective view of my acceleration sensor.

In FIG. 1, reference numeral 10 designates my acceleration sensor comprising a housing 11, a Y-shaped vibration sensing mass 12, a fluidic relay 13, and a reset mechanism 14. Vibration sensing mass 12 comprises a first end 12A and a second end 12B attached to a member 12C. End 12A and end 12B are constructed of magnetic materials to permit them to be acted on by magnetic forces. Member 12C may be a magnetic substance, but this is not necessary since magnetic forces do not act thereon.

Mass 12 attaches to mounting means 15 through a flexible hinge 16 which may be a piece of shim stock or the like. Hinge 16 allows mass 12 to rotate in a clockwise direction or in a counterclockwise direction around a vertical axis through hinge 16 but prevents mass 12 from moving along the vertical axis.

A spring 20 located in mounting means 15 exerts a force tending to cause mass 12 to rotate in a clockwise direction. This force can be changed by changing the tension of spring 20. The tension of spring 20 may be changed through a mechanism not shown by means of adjustment screw 19. The mechanism may be a ball in the end of spring 20 that is forced outward when a cone-shaped point on adjustment screw 19 moves downward. To prevent adjustment screw 19 from rotating due to vibrations, a screw 21 fastens the adjustment screw securely to the mounting means 15.

Adjacent to end 12A is a stop 30 with a magnet therein for attracting end 12A. Located in the magnet is a second adjustment screw 31 whereby end 12A can be kept a desired distance from the magnet. Adjacent to end 12B is another stop 32 which also has a magnet (hidden from view in FIG. 1) for attracting end 12B. Stop 30 and stop 32 are positioned so that if end 12A contacts the magnet or adjustment screw 31 within stop 30, end 12B is spaced from the magnet in stop 32, and vice versa. This is apparent by referring to FIG. 2 where the parts previously identified in FIG. 1 have the same reference numerals as those identical parts in FIG. 2. Magnet 50 in stop 30 and magnet 51 in stop 32 (hidden from view in FIG. 1) are visible in FIG. 2. Also visible are screws 53 and 54 for fastening stop 32 to housing 11 and screws 55 and 56 for fastening stop 30 to housing 11, which attaches to a second housing 34.

Figure 5:
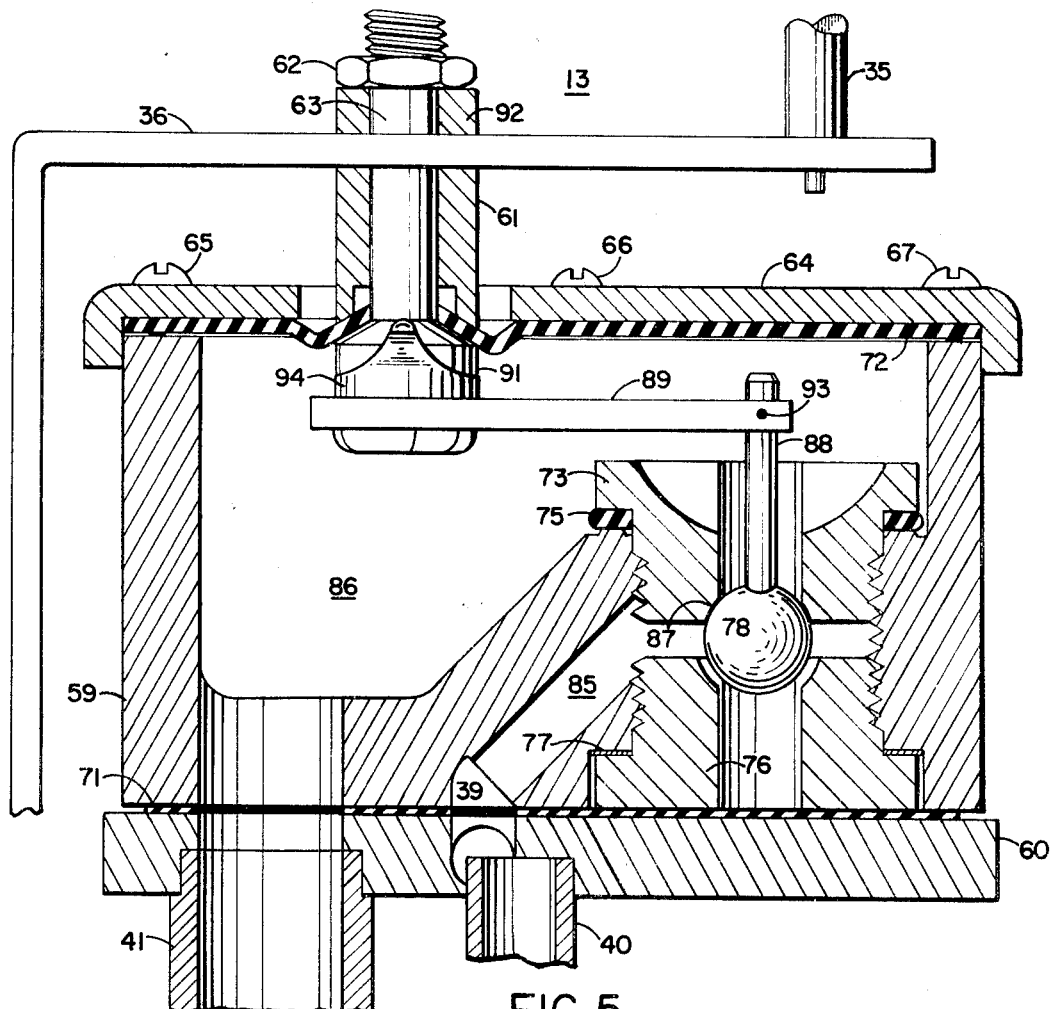
FIG. 5 is a side elevational view, greatly enlarged and partly in horizontal section, of a fluidic relay in my acceleration sensor.

The sensing mass 12 actuates fluidic relay 13 through a movable member 35 that extends from a trip bar 36 to end 12B through magnet 51 and stop 32. Fluidic relay 13 shown in FIGS. 1, 2, and 5 comprises a housing 59, a base plate 60, a cover 64, and screws 65, 66, and 67 for fastening the cover 64 to housing 59. A seal 71 located between housing 59 and base plate 60 prevents leakage from the bottom of relay 13. Similarly, a flexible seal 72 located between housing 59 and cover 64 prevents leakage from the top of relay 13. A hollow plug 73 is mounted in housing 59 and a seal 75 prevents leakage of fluid past the outside of plug 73. Similarly, a hollow plug 76 is mounted in housing 59 and a seal 77 prevents leakage past the outside of plug 76.

A ball-shaped armature 78 located between plugs 73 and 76 seals off a passage 85 from a chamber 86 when the armature contacts a seat 87 in plug 73. Armature 78 is connected to a bolt 63 through a member 88 and a member 89 which is fastened to member 88 by a pin 93. Bolt 63 and a nut 62 hold member 89, a collar 91, a sleeve 61, trip bar 36, and a washer 92 as a rigid unit. Flexible seal 72 is fastened between sleeve 61 and collar 91 to prevent leakage past bolt 63. An arcuate surface 94 on collar 91 holds the rigid unit in the position shown. That is, surface 94 holds the rigid unit toward the top of relay 13 in a pivotal manner so that bolt 63 may tilt toward the right or the left. In the normal position, armature 78 is held against seat 87, and in the tripped position member 89 tilts downward unseating armature 78.

An external fluid source 49 supplies a fluid to passage 85 through a passage 48, a restriction 47, a passage 46, an inlet 40 and a passage 39. Fluid is also supplied to a fluidic amplifier system (not shown) through the inlet 40, restriction 42, and a passage 43. Passage 39 is also connected to reset mechanism 14 through a passage 44 having a resistance 44A therein. Fluid exhausts from chamber 86 through passage 41 which comprises a vent through which all of the fluid used in sensor 10 may be collected.

Figure 2:
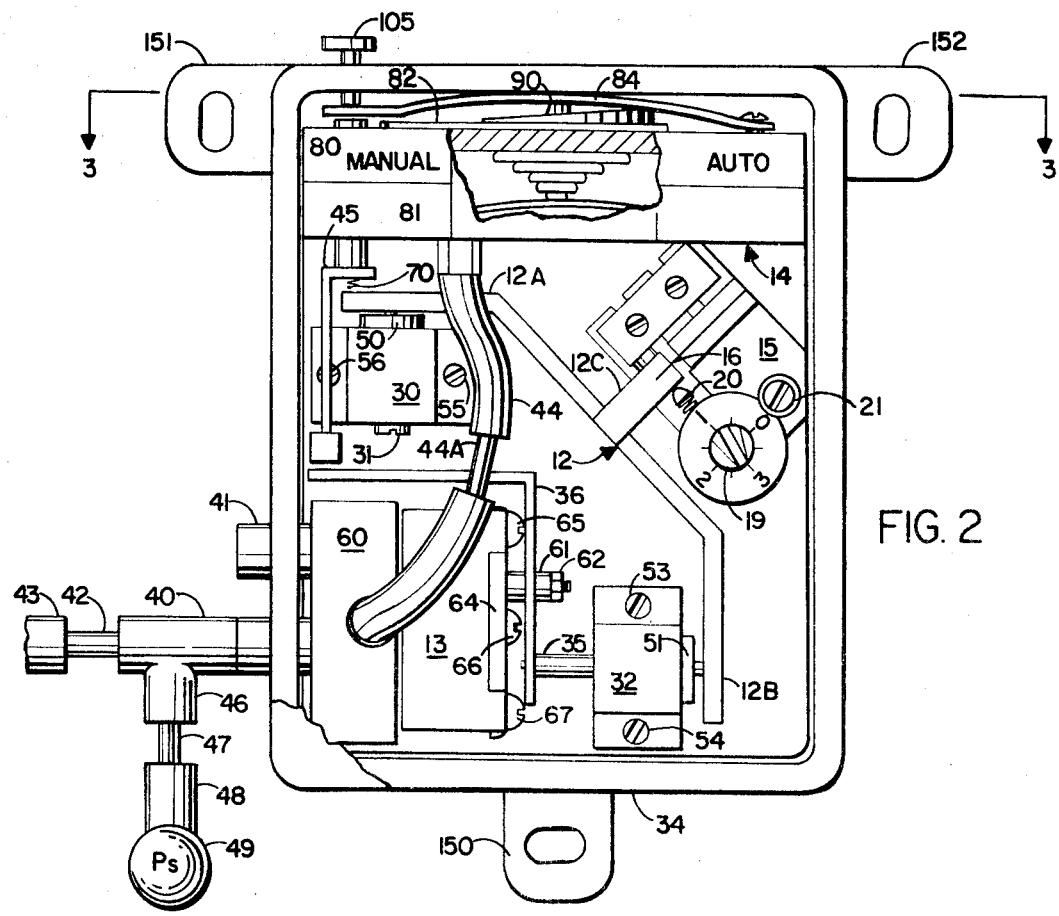
FIG. 2 is a plan view of the acceleration sensor and its housing.
Figure 3:
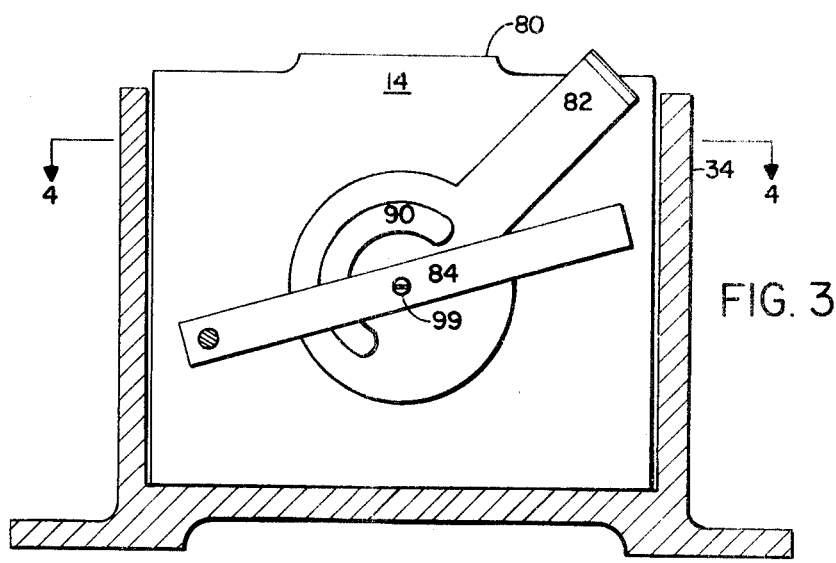
FIG. 3 is a vertical sectional view taken along line 3—3 of FIG. 2.
Figure 4:
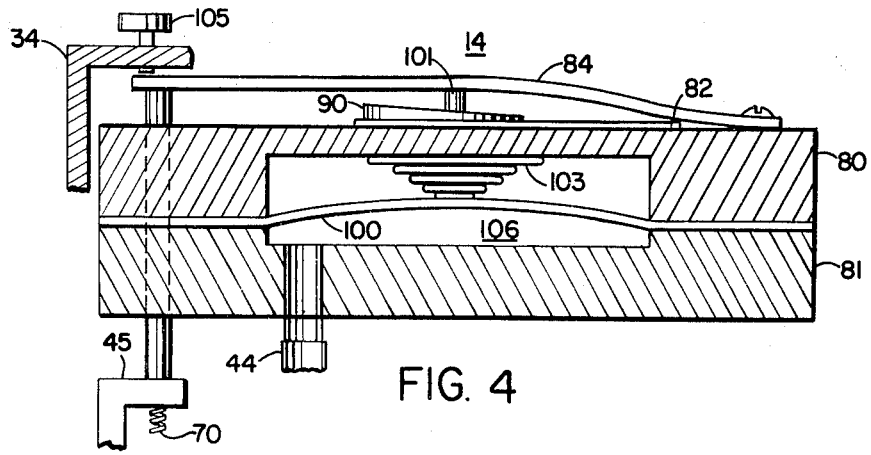
FIG. 4 is a detailed view (slightly enlarged) in horizontal section, of the reset mechanism of my acceleration sensor taken along line 4—4 of FIG. 3, showing the reset mechanism in the automatic reset position.

Reset mechanism 14 shown in FIGS. 2, 3, and 4 comprises a platet 80, a plate 81, a resetting selector 82, and a spring member 84. The resetting selector 82 has an inclined ridge 90 that pushes spring member 84 away from plate 80 when selector 82 is rotated into a "manual" position. When selector 82 is in the "manual" position, sensor 10 may be reset by depressing a manual reset button 105 in housing 34 which first pushes spring 70 against end 12A and then pushes a resetting bar 45 against trip bar 36.

Internally, the reset mechanism 14 comprises a flexible diaphragm 100 which has a center pin member 101 attached thereto that passes through a coil spring 103. Center pin member 101 is also attached to spring member 84 through a screw 99. Coil spring 103, in the absence of a pressure in a chamber 106, pushes diaphragm 100 toward plate 81. If the pressure in chamber 106 increases, diaphragm 100 deflects compressing coil spring 103 and pushing member 101 against spring member 84. Member 101 in turn pushes spring member 84 away from plate 80 allowing resetting bar 45 to retract.

Acceleration sensor 10 may be attached to apparatus which is to be monitored for excessive vibration through mounting means 150, 151, and 152 in housing 34.

Operation

Briefly, in the automatic operating condition of the acceleration sensor, excessive vibration causes Y-shaped mass 12 to move relative to housing 11, triggering fluidic relay 13. The fluidic relay 13 provides a fluidic output signal for controlling a device such as a fluidic amplifier. The fluidic output signal also activates the reset mechanism 14, thereby repositioning the Y-shaped mass 12 after a predetermined time has elapsed.

When the acceleration sensor is ready to sense excess vibration it is said to be in the set position. However, when excessive vibration has occurred, triggering the relay, it is said to be in the tripped position.

To explain the acceleration sensor operation, assume that the acceleration sensor 10 is in the set position. Further assume that reset mechanism 14 is in the "automatic" reset position (as shown in FIG. 4) so that the sensor automatically resets after a predetermined time has elapsed. FIG. 2 shows acceleration sensor 10 in the set position with end 12A in contact with adjustment screw 31 and end 12B separated from magnet 51. Note that since forces from a magnet vary inversely as the square of the distance from a magnetic substance, the magnetic force of magnet 50 acting on end 12A is strong when the magnetic force of magnet 51 acting on end 12B is weak, and vice versa. Also note that spring 20 and magnet 51 always exert a force tending to rotate mass 12 in a clockwise direction while magnet 50 always exerts a force tending to rotate mass 12 in a counterclockwise direction.

The strong force of magnet 50 holds the mass in the set position because the force from spring 20 and the weak force from magnet 51 are slightly less than the strong force of magnet 50. Conversely, if end 12B contacts magnet 51, the strong force of magnet 51 and the force of spring 20 are considerably greater than the weak force of magnet 50, thus securely holding the mass in the tripped position until the sensor is reset manually or automatically. The force exerted by magnet 50 can be varied by turning adjustment screw 31, thus changing the distance between magnet 50 and end 12A.

Let us assume that accelerations such as vibrations occur producing a force sufficiently large to dislodge end 12A from magnet 50. As end 12A moves away from magnet 50 end 12B moves toward magnet 51, causing a decrease in force on end 12A and an increase in the force on end 12B. Consequently end 12B snaps against magnet 51. (Note there is no adjustment screw to vary the proximity of end 12B to magnet 51.) This movement pushes movable member 35 toward relay 13 which causes the relay to produce a fluidic output signal at fluid conduit 43. More specifically the movement of member 35 toward relay 13 tilts trip bar 36 which is connected to armature 78 through the rigid assembly comprised of bolt 63, member 88, member 89, collar 91, sleeve 61, washer 92, and nut 62. (Note that flexible seal 72 allows the rigid assembly to tilt as a unit on surface 94 when trip bar 36 tilts.) As member 89 tilts downward armature 78 unseats allowing fluid to flow from passage 40 into chamber 86 through passage 39 and passage 85. As fluid flows into relay 13 the pressure in passage 40, restriction 42, and passage 43 decreases sharply, thus provfidding a signal which may be used to actuate a fluidic amplifier.

Unseating armature 78 also allows fluid to vent slowly from reset mechanism 14 into fluid passage 41 through restriction 44a in passage 44, passage 39, passage 85, and chamber 86. Because of restriction 44a fluid slowly exhausts from chamber 106, thus gradually decreasing the pressure therein. As the pressure within chamber 106 decreases, coil spring 103 pushes diaphragm 100 toward plate 81. When coil spring 103 pushes diaphragm 100 toward plate 81, center pin member 101 retracts, allowing spring member 84 to move toward plate 80. As spring member 84 moves toward plate 80, it pushes resetting bar 45 and spring 70, which pushes end 12A toward magnet 50, thereby restoring the original magnetic couple between magnet 50 and the end 12A. The resetting bar also pushes trip bar 36 to its original position, reseating armature 78 within fluidic relay 13. With armature 78 reseated, the fluid in inlet 40 flows into chamber 106 through passage 39 and passage 44, thus pressurizing chamber 106 and pushing diaphragm 100 toward plate 80. The diaphragm pushes the center pin member 101 against spring member 84, retracting the resetting bar 45 from contact with trip bar 36, and spring 70 from contact with end 12A. Mass 12 is then in the set position with the magnetic couple between magnet 50 and end 12A restored as the predominant force.

The time required for resetting acceleration sensor 10 can be varied by changing restriction 44A located in passage 44. For example, with a large restriction (a small cross sectional area in restriction 44A), more time is required for fluid to exhaust from chamber 106. Consequently, a longer time elapses before pressure in chamber 106 diminishes enough to allow spring member 84 to reset end 12A against magnet 50.

Acceleration sensor 10 can be prevented from automatically resetting by moving resetting selector 82 to the "manual" position. In the "manual" position (FIG. 2) inclined ridge 90 prevents spring member 84 from moving toward plate 80 when the pressure diminshes in chamber 106. In the "manual" position, sensor 10 is reset by depressing manual reset button 105. Depressing manual reset button 105 bends spring member 84 toward plate 80, pushing reset bar 45, thereby repositioned mass 12.

The automatic resetting feature is advantageous since, in certain instances, such as during starting, transient or temporary excessive vibrations occur which do not require complete system shutdown. During these periods the sensors are prevented from shutting the whole system down by a mechanism not shown. With an automatic reset mechanism, the sensor automatically resets, prior to affecting the shutdown system, thus eliminating the need for an operator to restart the system if temporary excessive vibrations occurred. Considerations such as these are important in areas such as the natural gas line pumping industry in which the amount of down time is very costly and transient vibration conditions sometimes occur during starting.

What is claimed is:

1. In acceleration responsive apparatus including a housing, a mass element pivotally mounted on said housing and constrained to a single degree of freedom of rotation about an axis between a set position and a tripped position, said mass element having its center of mass separated from said axis, first releasable coupling means including a portion fixed to said housing and a portion on said mass element for normally maintaining said mass element in the set position, and second releasable coupling means including a portion fixed to said housing and a portion on said mass element for holding said mass element in the tripped position if the coupling force provided by said first coupling means is broken by subjecting said apparatus to acceleration about said axis in excess of a predetermined magnitude, the improvement which comprises:

signal means responsive to the position of said mass element, said signal means operable to produce a characteristic signal when said mass element is in the tripped position;

self reset means operable in response to said characteristic signal to move said mass element to the set position and reestablish the coupling force of said first coupling means upon the lapse of a predetermined period of time after receipt of said signal; and means connecting said signal means to said self reset means for supplying signals thereto, whereby in the event that said mass element is dislodged from the set position and assumes the tripped position, said signal means supplies said characteristic signal to said self reset means which, after a predetermined lapse of time, resets said mass element to the set position.

2. The apparatus of claim 1 wherein said signal means produces fluid signals indicative of the position of said mass element and wherein said self seset means is operable to reset said mass element to the set position upon the lapse of a predetermined period of time after receipt of a characteristic fluid signal.

3. The apparatus of claim 2 wherein said self reset means comprises a pressure chamber sealed by a flexible diaphragm, and linkage for transmitting deflections of said diaphragm to said mass element, said diaphragm and linkage being spring biased so as to tend to maintain said mass element in the set position, pressure in excess of a predetermined magnitude in said pressure chamber being effective to overcome the spring bias; and wherein said characteristic fluid signal is a pressure signal of less than the predetermined magnitude.

4. The apparatus of claim 3 wherein said signal means comprises a fluidic relay having a supply port, a signal port, and a reset port arranged so that fluid entering the supply port is used to provide fluid signals at both the signal port and the reset port; and wherein the supply port, signal port, and reset port are further arranged so that with the reset port connected to said self reset means, all fluid entering through the supply port exhausts through the signal port.

5. The apparatus of claim 4 further including means for disabling said self reset means and means for manually resetting said mass element.

6. Acceleration responsive apparatus comprising:

a housing;

a mass element pivotally mounted on said housing and constrained to a single degree of freedom of rotation about an axis between a set position and a tripped position, said mass element having its center of mass separated from said axis, rotation of said mass element with respect to said housing occurring in response to acceleration of said acceleration responsive apparatus;

first magnetic coupling means including a portion fixed to said housing and a portion on said mass element for normally maintaining said mass element in the set position, said first magnetic coupling means further including adjustable means for providing a minimum separation between the portion fixed to said housing and the portion on said mass element, thereby providing for a variable maximum coupling force;

second magnetic coupling means including a portion fixed to said housing and a portion on said mass element for holding said mass element in the tripped position if the coupling force provided by said first coupling means is broken by acceleration about said axis in excess of a predetermined magnitude determined at least in part by the adjustable means in said first coupling means;

signal means operable to produce a signal indicative of the position of said mass element; and self reset means connected to said signal means so as to receive the signal therefrom, said self reset means operable to move said mass element to the set position and reestablish the coupling force of said first magnetic coupling means in response to a signal from said signal means indicating that said mass element is in the tripped position.

7. The apparatus of claim 6 further including adjustable spring bias means arranged to urge said mass element to the tripped position whereby the magnitude of acceleration at which said mass element is dislodged from the set position can be further varied.

8. The apparatus of claim 7 wherein said mass is distributed in a Y-shaped structure and wherein said first and said second magnetic coupling means are located at separate extremities of said Y-shaped structure.

References Cited

UNITED STATES PATENTS

| | | | |
|---|---|---|---|
| 2,163,988 | 6/1939 | Stacey | 137—38 |
| 2,302,322 | 11/1942 | Howard | 137—45 X |
| 2,325,725 | 8/1943 | Wood | 137—38 |
| 2,920,924 | 1/1960 | Reswick | 137—48 X |
| 2,942,456 | 6/1960 | Hardway | 73—517 X |
| 2,986,615 | 5/1961 | Hardway | 73—514 X |
| 3,307,394 | 3/1967 | Bilbrey | 73—71 |

CLARENCE R. GORDON, Primary Examiner

U.S. Cl. X.R.

73—71